No. 826,434. PATENTED JULY 17, 1906.
J. LALLY.
ROD AND PIPE CUTTING MACHINE.
APPLICATION FILED AUG. 8, 1905.
2 SHEETS—SHEET 1.
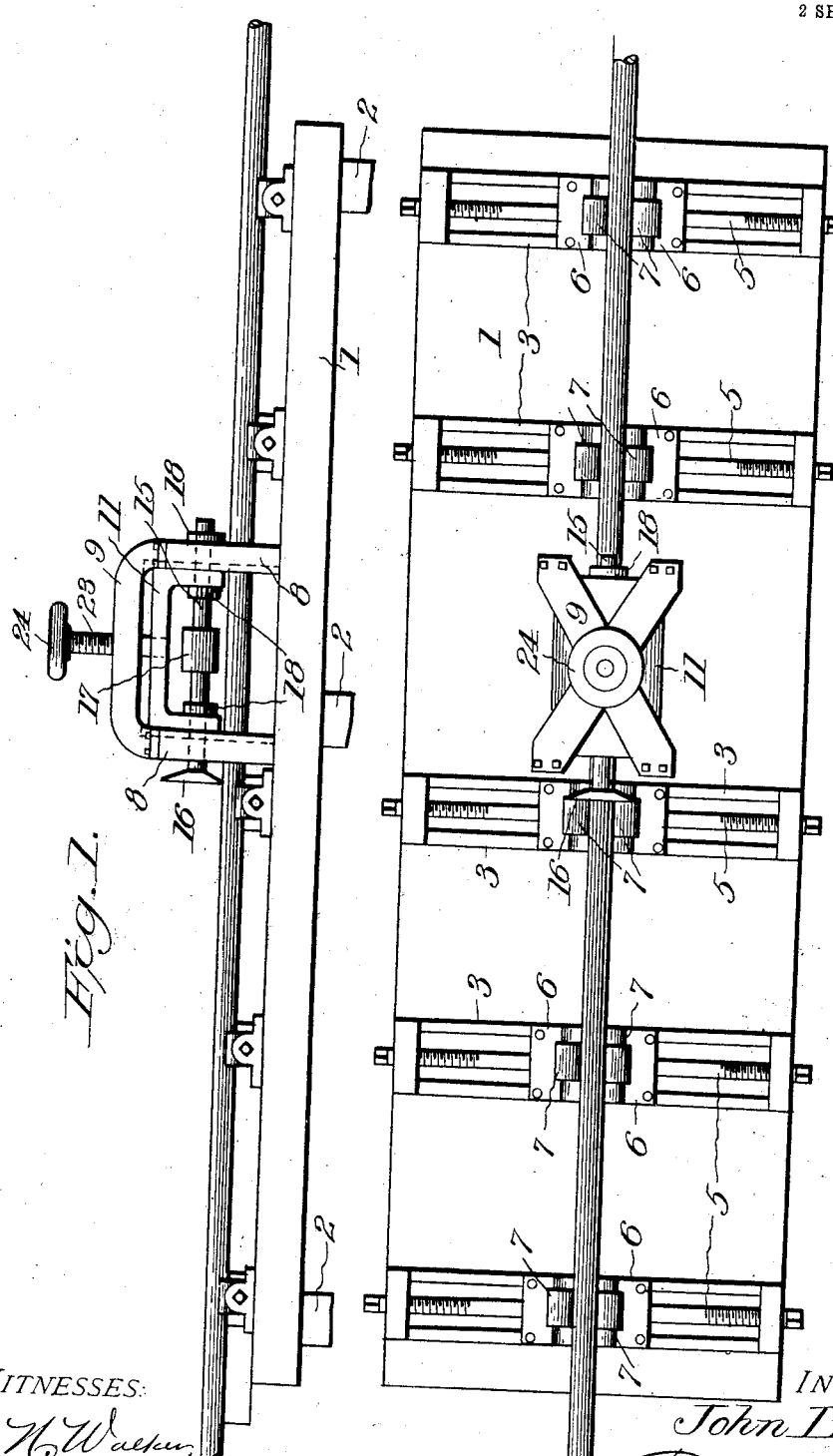
WITNESSES:
INVENTOR
John Lally.
BY
Attorney

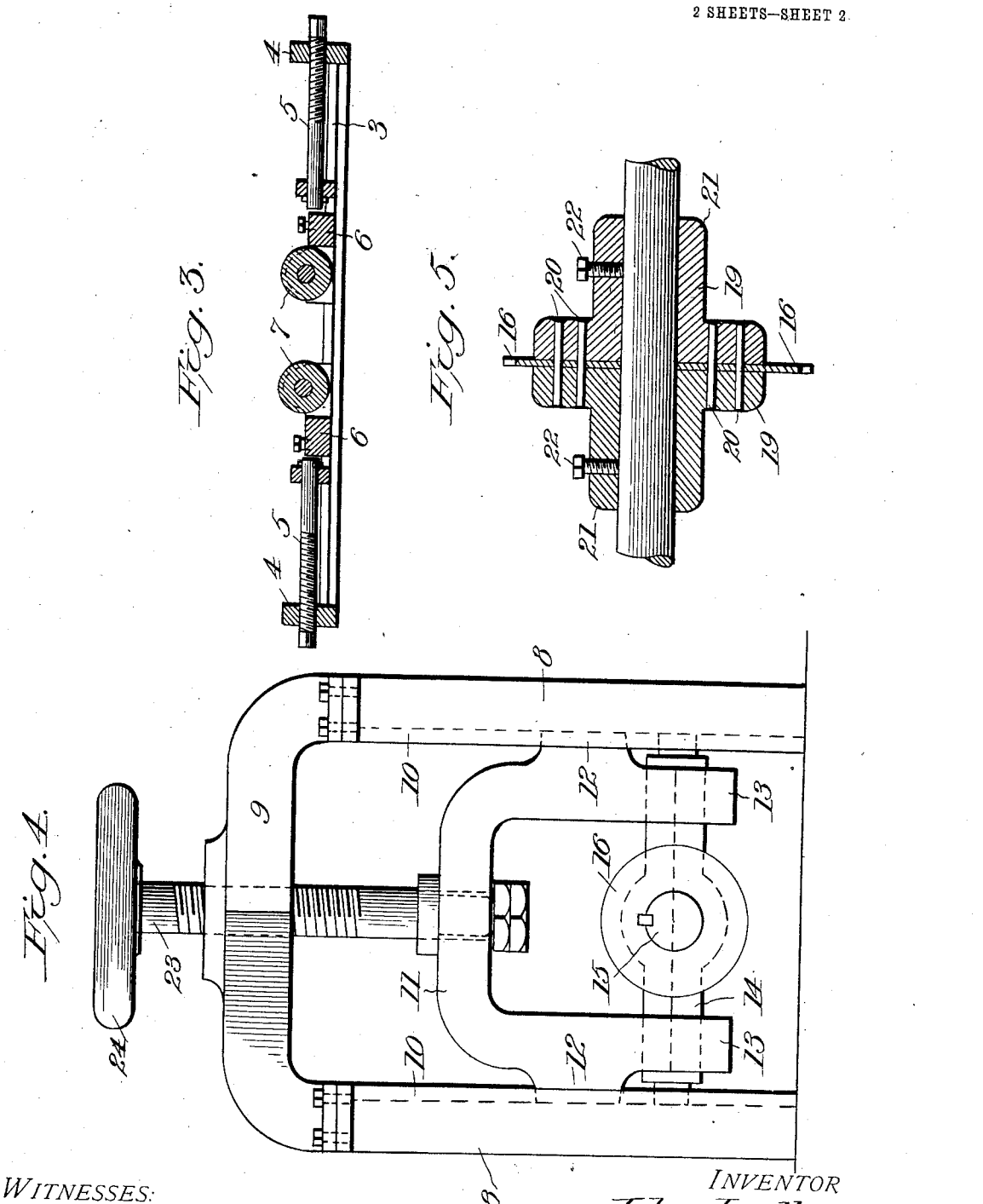

UNITED STATES PATENT OFFICE.

JOHN LALLY, OF WALTHAM, MASSACHUSETTS.

ROD AND PIPE CUTTING MACHINE.

No. 826,434.     Specification of Letters Patent.     Patented July 17, 1906.

Application filed August 8, 1905. Serial No. 273,282.

*To all whom it may concern:*

Be it known that I, JOHN LALLY, a citizen of the United States, residing at Waltham, in the county of Middlesex and State of Massachusetts, have invented a certain new and useful Rod and Pipe Cutting Machine, of which the following is a specification, reference being had therein to the accompanying drawings.

This invention relates to pipe and rod cutting machines, the object of the invention being to provide a machine of the character referred to which is adapted to be operated at a high rate of speed and which will make a clean square cut through a pipe or rod.

By means of the construction hereinafter described the machine is adapted to pipes or rods of any size, being for that purpose provided with supporting-rollers so arranged and mounted in connection with adjusting devices that they may be accurately set to form an efficient seat or rest for a pipe or rod of any size. Provision is also made for adjusting the cutter toward and away from its work and obtaining an even and effective feeding of the cutter during the operation of the same on the pipe or rod.

With the above and other objects in view, the nature of which will more fully appear as the description proceeds, the invention consists in the novel construction, combination, and arrangement of parts, as fully described, illustrated, and claimed.

In the accompanying drawings, Figure 1 is a side elevation of a machine embodying the present invention. Fig. 2 is a plan view of the same. Fig. 3 is a vertical cross-section showing the means for adjusting the supporting-rollers. Fig. 4 is an enlarged elevation showing the fixed and movable frames of the cutting apparatus. Fig. 5 is an enlarged sectional view of the rotary cutter.

Like reference-numerals designate corresponding parts in all figures of the drawings.

The machine contemplated in this invention comprises a bench or table 1, which may be supported at a suitable elevation by means of legs 2. Said table may either be solid, as shown, or consist of a suitable skeleton framework, and at suitable intervals through the length of the table are arranged tracks or guides 3, extending transversely across the table, as shown. Each of said tracks comprises at its opposite outer extremities upstanding nuts 4 or lugs formed with threaded openings therein to receive and admit of the adjustment of screws 5, the inner ends of which have a swiveled engagement with roller-carrying frames or runners 6. These runners move inward and outward on the tracks or guides 3 as the adjusting-screws therefor are revolved and carry with them the pipe or rod supporting rollers 7, the latter being journaled in or on the runners and being arranged in oppositely-located pairs. In setting the machine to operate upon a pipe or rod the several pairs of rollers are all brought into alinement lengthwise of the machine, and in this way a rest or seat of considerable length is provided for the work, thus adding materially to the efficiency of the cutting apparatus to be described as the work is caused to revolve on its true longitudinal axis.

At a suitable point intermediate the ends of the table 1 there is located a fixed guide-frame embodying posts 8 and a removable head-section 9, bolted or otherwise fastened to and upon the posts 8, as best shown in Fig. 4, so that the upper part of the frame may be removed to get out the cutting mechanism when necessary. The inner faces of the posts are grooved or rabbeted, as shown at 10, to form guides for a sliding frame or yoke 11, the latter having ribs or extensions 12, which work up and down in such grooves or rabbets. (See Fig. 4.) The sliding frame or yoke is also provided with pendent bearings 13 for the reception of cross-heads 14, in which is journaled the cutter-shaft 15, carrying the rotary cutter 16, which operates directly over the work, as shown in Fig. 1. The shaft 15 is equipped with a band-pulley 17 to receive a belt from any source of power, and said shaft is further provided with stop-collars 18 to hold the shaft against longitudinal movement.

The cutter in its preferred embodiment consists of a thin flat-edged disk 16, as shown in Fig. 5, said edge being formed with cutting-teeth of the full width of the edge, so as to produce a square cut in the rod or pipe being operated upon by the machine. Said disk-shaped cutter is securely held between clamps 19, arranged on opposite sides thereof and preferably connected by pins or rivets 20, which also pass through the cutter, as shown. The clamps have extended hubs 21 to provide for set-screws 22, by means of which the clamps are fastened on the cutter-shaft. The edge of disk 16 may be beveled or otherwise formed with a proper cutting edge.

Passing through the upper portion of the fixed frame is a feed-screw 23, having a suitable hand-operating wheel or its equivalent 24, the lower end of said feed-screw being journaled in the upper part of the sliding frame or yoke, so that by turning the feed-screw the yoke is moved up or down, thus moving the cutter and its shaft toward and away from the work. By the mechanism just described the cutter is fed up to its work, and any desired pressure may be obtained between the cutter and the pipe or rod being operated upon.

The pipe and rod cutting machine hereinabove described is susceptible of being driven at a very high rate of speed, and a clean square cut is produced in the pipe or rod. The pipe or rod is free to revolve under the influence of the rapidly-rotating cutter. Thus the danger of binding between the cutter and the work and the consequent breakage of the cutter or other parts of the machine is reduced to a minimum. A beveled cutter, such as is shown in Figs. 1 and 2, may be used, if desired. In any event the rotating cutter by contact with the pipe or rod causes the latter to rotate at the same time. This enables a high rate of speed to be obtained without danger of overheating the work or cutter.

Having described the invention, I claim as new—

1. A pipe and rod cutting machine comprising a table, a rotary cutter-shaft, a guide-frame connected to the table and extending upward therefrom, a sliding frame movable up and down on the guide-frame and having a cutter-shaft journaled therein, means for moving the cutter-shaft toward and away from the working position, carriers movable in planes at right angles to the axis of the cutter-shaft, rollers on said carriers and means for advancing and retracting the carriers each independently of the others.

2. A pipe and rod cutting machine comprising a table, a rotary cutter-shaft, a guide-frame connected to the table and extending upward therefrom, said guide-frame embodying parallel posts, a sliding frame engaging said posts and movable up and down on the guide-frame and having the cutter-shaft journaled therein, carriers movable in planes at right angles to the axis of the cutter-shaft, rollers on said carriers and means for advancing and retracting the carriers, each independently of the others.

3. A pipe and rod cutting machine comprising a table, a rotary cutter-shaft, a guide-frame connected to the table and extending upward therefrom, said guide-frame embodying parallel posts and a removable head-section connecting said posts, a sliding frame engaging said posts and movable up and down on the guide-frame and having the cutter-shaft journaled therein, work-supporting rollers adjustable transversely across the table and means for moving the cutter-shaft toward and away from the working position.

4. A pipe and rod cutting machine comprising a table, a rotary cutter-shaft, a guide-frame connected to the table and extending upward therefrom, a sliding frame movable up and down on the guide-frame and having the cutter-shaft journaled therein, carriers movable in planes at right angles to the axis of the cutter-shaft, shoulders on said carriers, feed-screws for advancing and retracting the carriers each independently of the others, and means for moving the cutter-shaft toward and away from the working position.

5. A pipe and rod cutting machine comprising a table, a rotary cutter-shaft, a guide-frame connected to the table and extending upward therefrom, said guide-frame embodying parallel posts, a sliding frame engaging said posts and movable up and down on the guide-frame, one or more cross-heads having a sliding engagement with said posts and guided thereby and having the cutter-shaft journaled therein, work-supporting rollers mounted on the table and means for moving the cutter-shaft toward and away from the working position.

In testimony whereof I affix my signature in presence of two witnesses.

JOHN LALLY.

Witnesses:
  JOHN H. BROWN,
  PATRICK J. DUANE.